(12) United States Patent
Kraemer

(10) Patent No.: US 11,343,280 B2
(45) Date of Patent: May 24, 2022

(54) SYSTEM AND METHOD FOR IDENTIFYING AND CONTROLLING POLYMORPHIC MALWARE

(71) Applicant: Carbon Black, Inc., Waltham, MA (US)

(72) Inventor: Jeffrey Albin Kraemer, Wellesley, MA (US)

(73) Assignee: Carbon Black, Inc., Palo Alto, CA (US)

( * ) Notice: Subject to any disclaimer, the term of this patent is extended or adjusted under 35 U.S.C. 154(b) by 52 days.

(21) Appl. No.: 16/427,758

(22) Filed: May 31, 2019

(65) Prior Publication Data

US 2019/0306195 A1    Oct. 3, 2019

Related U.S. Application Data

(60) Division of application No. 15/881,044, filed on Jan. 26, 2018, now Pat. No. 10,348,771, which is a continuation of application No. 15/255,374, filed on Sep. 2, 2016, now Pat. No. 9,917,864, which is a division of application No. 14/824,847, filed on Aug.
(Continued)

(51) Int. Cl.
*H04L 29/06* (2006.01)
*H04L 9/40* (2022.01)
*G06F 21/55* (2013.01)
*G06F 21/56* (2013.01)

(52) U.S. Cl.
CPC ............ *H04L 63/20* (2013.01); *G06F 21/552* (2013.01); *G06F 21/554* (2013.01); *G06F 21/56* (2013.01); *G06F 21/566* (2013.01); *H04L 63/1433* (2013.01); *H04L 63/1441* (2013.01); *G06F 2221/034* (2013.01); *G06F 2221/2101* (2013.01)

(58) Field of Classification Search
CPC . H04L 63/20; H04L 63/1416; H04L 63/1433; H04L 63/1441; G06F 21/552; G06F 21/566
See application file for complete search history.

(56) References Cited

U.S. PATENT DOCUMENTS 7,698,744 B2   4/2010   Fanton et al.
7,841,008 B1   11/2010   Cole et al.
(Continued)

FOREIGN PATENT DOCUMENTS

WO    WO 2011/019720    2/2011

OTHER PUBLICATIONS

Comodo, "Comodo Cloud Scanner—Software version 2.0 User guide," Jul. 25, 2011, Comodo Security Solutions Inc., pp. 1-44.
(Continued)

*Primary Examiner* — Dao Q Ho

(57) ABSTRACT

The present system and method pertain to the detection of malicious software and processes such as malware. A cloud security policy system receives hashes and behavioral information about applications and/or processes executing on user devices. The cloud security policy system records this information and then evaluates the trustworthiness of the hashes based on the information received from the user devices to provide a security policy for the applications and/or processes. The security policy is sent from the cloud security policy system to user devices to be applied by the user devices.

22 Claims, 16 Drawing Sheets

| Unknown Application/Hash Behavior | Security Policy Enforcement Action |
|---|---|
| Turn on microphone | Terminate application |
| Monitor keystrokes | Terminate application |
| Read user documents | Prevent network access |
| * | * |
| * | * |
| * | * |
| * | * |
| Read user contact information | No restrictions |

404 / 402

Related U.S. Application Data 12, 2015, now Pat. No. 9,460,285, which is a division of application No. 13/662,036, filed on Oct. 26, 2012, now Pat. No. 9,223,978.

(60) Provisional application No. 61/552,654, filed on Oct. 28, 2011.

(56) References Cited

U.S. PATENT DOCUMENTS

| | | | |
|---|---|---|---|
| 8,234,640 | B1 | 7/2012 | Fitzgerald et al. |
| 2006/0036693 | A1 | 2/2006 | Hulten et al. |
| 2010/0211772 | A1 | 8/2010 | Johansson et al. |
| 2011/0047594 | A1 | 2/2011 | Mahaffey et al. |
| 2011/0047620 | A1 | 2/2011 | Mahaffey et al. |
| 2011/0185417 | A1 | 7/2011 | Zhou et al. |
| 2012/0017275 | A1* | 1/2012 | Harmonen ............ G06F 21/56 726/24 |
| 2012/0240229 | A1 | 9/2012 | Sobel et al. |
| 2013/0097660 | A1 | 4/2013 | Das et al. |
| 2013/0111547 | A1 | 5/2013 | Kraemer |
| 2013/0111591 | A1 | 5/2013 | Topan et al. |

OTHER PUBLICATIONS

International Preliminary Report on Patentability, dated May 8, 2014, from counterpart International Application No. PCT/US2012/062229, filed Oct. 26, 2012.

International Search Report and the Written Opinion of the International Searching Authority, dated Feb. 13, 2013 from counterpart International Application No. PCT/US2012/062229, filed Oct. 26, 2012.

Ye, Y. et al., "Combining File Content and File Relations for Cloud Based Malware Detection," KDD' 11, Aug. 21-24, 2011, San Diego, California, USA, pp. 222-230.

* cited by examiner

| | "Control" | | Variance | Learning | |
|---|---|---|---|---|---|
| | Read User Data | HTTP | Visible Window | Modify Registry Key X | Sys API call Y |
| Trusted | YES | YES | 98% | 1% | 45% |
| Malware | YES | YES | 15% | 8% | 42% |
| Unknown App 1 | YES | YES | NO | YES | NO |
| Unknown App 2 | YES | YES | YES | YES | |

Fig. 6B

SYSTEM AND METHOD FOR IDENTIFYING AND CONTROLLING POLYMORPHIC MALWARE

RELATED APPLICATIONS

This application is a Division of U.S. application Ser. No. 15/881,044, filed on Jan. 26, 2018, which is a Continuation of U.S. application Ser. No. 15/255,374, filed on Sep. 2, 2016, which is a Division of U.S. application Ser. No. 14/824,847, filed on Aug. 12, 2015, which is a Division of U.S. application Ser. No. 13/662,036, filed on Oct. 26, 2012, which application claims the benefit under 35 U.S.C. § 119(e) of U.S. Provisional Application No. 61/552,654, filed on Oct. 28, 2011, all of which are incorporated herein by reference in their entirety.

BACKGROUND OF THE INVENTION

Malware (or malicious software) is a computer program that is often designed to disrupt network communications, gain control over computers or networks, or secretly gather personal information about users. Malware typically includes viruses, trojans, adware, and spyware, to list a few examples.

Malware is created for a variety of reasons such as to achieve wide-spread notoriety or for personal gratification. Alternatively, malware is created to secretly access financial information such as banking records, credit card numbers, and/or social security numbers of individuals. While these exploits are frustrating and possibly destructive, they are also fairly simple.

Currently, signature based anti-malware software combats malware by using hashes (i.e., unique signatures of the malware) to identify and quarantine (or remove) the malware. Typically, the anti-malware software utilizes databases containing records of hashes for known malware. If a program's hash matches a hash of known malware, then the program is quarantined or removed.

SUMMARY OF THE INVENTION

One problem with current anti-malware software is that the software is not able to detect new malware threats (often referred to as zero-day or day-zero malware) because hashes for these new threats do not exist in any databases of known malware. Additionally, in some cases, the new malware is able to evade signature based anti-malware software for weeks or even months.

Additionally, as malware evolves, the complexity and purpose of the malware evolves as well. For example, two recent trends in the creation of malware are making existing anti-malware software less effective.

The first trend is that a large percentage of new malware is polymorphic. That is, when the malware replicates, it also mutates to change the contents of the file containing the virus and possibly the behavior of the malware. Thus, each mutation creates a new version of the malware with a new and unique hash. The polymorphic nature of the malware renders traditional signature based solutions ineffective because the newly created hashes do not exist in any databases of known malware.

The second trend is the emergence of advanced persistent threats, which are often implemented by organized crime groups or state-sponsored by foreign entities. The advanced persistent threats are uniquely customized attacks that target individuals or specific companies. The goal of the attack is often the undetected theft of sensitive data, financial information of individuals or companies, or incapacitation of a victim's computer or network. Because the advanced persistent threats are customized to the victims and are designed to be undetected, the signatures of the advanced persistent threats are rarely added to the databases of known malware.

Currently, there are no solutions that adequately address day-zero malware or advanced persistent threat problems in addition to more traditional malware versions. The present invention concerns a method and system that can detect new or polymorphic computer viruses, persistent day-zero exploits, advanced persistent threats, and other malicious software. Additionally, the present invention can be directed to applying monitors and controls to user devices, which are able to protect against these exploits.

In more detail, in a proposed system, a cloud security policy system receives hashes and behavioral information about applications and/or process from different user devices. The cloud security policy system records this information along with a time-stamp to track when an event (e.g., file accessed, created, or loaded) occurred. The cloud security policy system then evaluates the trustworthiness of the hashes based on the information received from the different user devices to provide (or update) a security policy for the applications and/or processes. The security policy is then sent from the cloud security policy system to user devices to be applied by the user devices.

In general, according to one aspect, the invention features a system for detecting malware. The system includes user devices that monitor executing applications and a security policy system that receives requests from the user devices for security policies associated with the applications and sends the security policies to the user devices from which the requests originated.

In general, according to another aspect, the invention features a method for providing security policies. The method includes receiving behavioral information about processes executing on different user devices, determining trustworthiness for each of the processes based on the behavioral information received from each of the different user devices, and providing security policies for the processes to the different user devices based on the determined trustworthiness.

In general, according to still another aspect, the invention features a security policy system. The system includes a web services component of the security policy system that receives behavioral information about processes executing on different user devices. The system further includes an analysis engine of the security policy system that determines trustworthiness for each of the processes based on the behavioral information received from each of the different user devices. Lastly, the system also includes a policy engine of the security policy system that provides security policies for the processes to the different user devices based on the determined trustworthiness.

In general, according to still another aspect, the invention features a method for implementing security policies on user devices. The method includes monitoring processes executing on user devices and searching for security policies associated with the processes. The method further includes upon locating security policies, applying the security policies to the processes, and upon failing to locate security policies on the user devices, sending requests to a security policy system. Lastly, upon receiving security policies from the centralized security system, applying the security policies to the processes.

In general, according to still another aspect, the invention features a method for monitoring applications on user devices. The method includes monitoring applications requesting to open files using system dynamic-link libraries and searching for hashes corresponding to filenames of the files requested by the application in caches of the user devices. The method includes that upon locating hashes in the caches of the user devices, searching for security policies associated with the hashes. Additionally, upon locating the security policies associated with the hashes, enforcing restrictions of the security policies.

In general, according to still another aspect, the invention features a method for monitoring processes executing on user devices. The method includes intercepting application program interface calls to monitor resource requests of executing processes. The method further includes maintaining a log of the resource requests in a database if the processes are being monitored. The method further includes applying security policies to the processes if the processes are controlled by security policies and sending the log of resource requests to a security policy system.

In general, according to another aspect, the invention features a distributed security system for monitoring processes executing on user devices. The system includes an application program interface detour that intercepts application program interface calls and monitors resource requests of executing processes. The system further includes a reputation manager that applies security policies to the processes if the processes are controlled by the security policies. The system further includes a database of a user system that stores logs of resource requests if the processes are being monitored by the reputation manager and a reputation database of a security policy system that stores logs of resource requests from multiple user devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6B is a table illustrating how actions of unknown applications are compared to actions performed by malware and trusted applications to determine the trustworthiness of the unknown applications.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of nouns and the articles "a", "an" and "the" are intended to include the plural forms as well, unless expressly stated otherwise. It will be further understood that the terms: includes, comprises, including and/or comprising, and the like, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
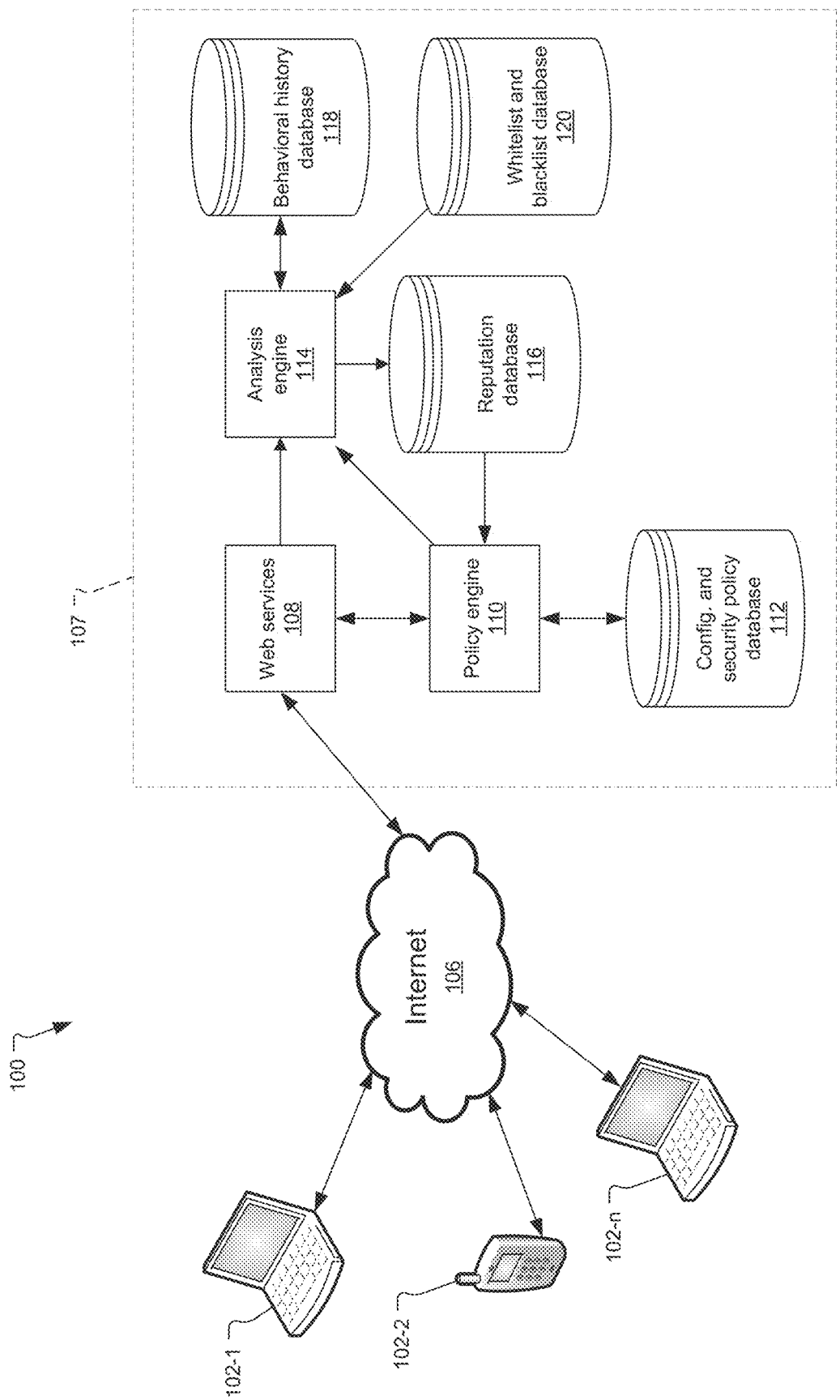
FIG. 1A is a block diagram illustrating a distributed security system for the detection and control of malware.

FIG. 1A is a block diagram illustrating a distributed security system 100 for the detection and control of malware, which has been constructed according to the principles of the present invention.

In general, the distributed security system 100 includes user devices 102-1 to 102-n in communication with a cloud security policy system 107 via a private and/or public data network such as the Internet 106. The user devices 102-1 to 102-n monitor applications and send information and security requests to the cloud security policy system 107. The cloud security policy system 107 determines the trustworthiness for the applications, processes, and files, for example, and provides security policies to the user devices 102-1 to 102-n.

In a typical implementation, each user device 102-1 to 102-n runs agent security software, which monitors applications and/or processes executing on the user devices 102-1 to 102-n along with access files from storage media and/or via network interfaces. The user devices 102-1 to 102-n include desktop and laptop computers (running Windows by Microsoft Corp., Mac OS X by Apple Inc., Linux), tablets or slate computing devices, and mobile computing devices (e.g., smartphones running iOS by Apple Inc. or Android by Google Inc.), to list a few examples.

In a typical implementation, if the agent security software detects an application accessing files on the user device (e.g., 102-1), the agent security software attempts to locate a security policy for the application on that user device. If the agent security software is unable to locate security policy on the user device, then the agent security software sends a request for a security policy to the cloud security policy system 107 via the Internet 106.

The cloud security policy system 107 receives security policy requests from all the user devices 102-1 to 102-n, calculates trustworthiness of applications and/or files based on information received from the user devices 102-1 to 102-n, and provides customized security policies to the user devices 102-1 to 102-n from which the requests originated.

In the illustrated embodiment, the cloud security policy system 107 includes a web services component 108, a policy engine 110, and an analysis engine 114.

The web services component 108 receives security policies request from user devices 102-1 to 102-n and forwards the requests to the policy engine 110.

The policy engine searches for security policies in the configuration and security policy database 112 and reputation database 116.

The analysis engine 114 calculates trust (or reputation) scores to determine the trustworthiness of the applications and whether the applications are malicious or benign.

In the illustrated example, the cloud security policy system 107 also includes a behavioral information database 118 that stores behavioral information about applications received from user devices 102-1 to 102-n and a whitelist/blacklist database 120 that stores records of whitelisted and blacklisted applications. In a typical implementation, the databases of the cloud security policy system 107 (e.g., reference numerals 112, 116, 118, and 120) are a SQL (Structured Query Language) databases.

Figure 1B:
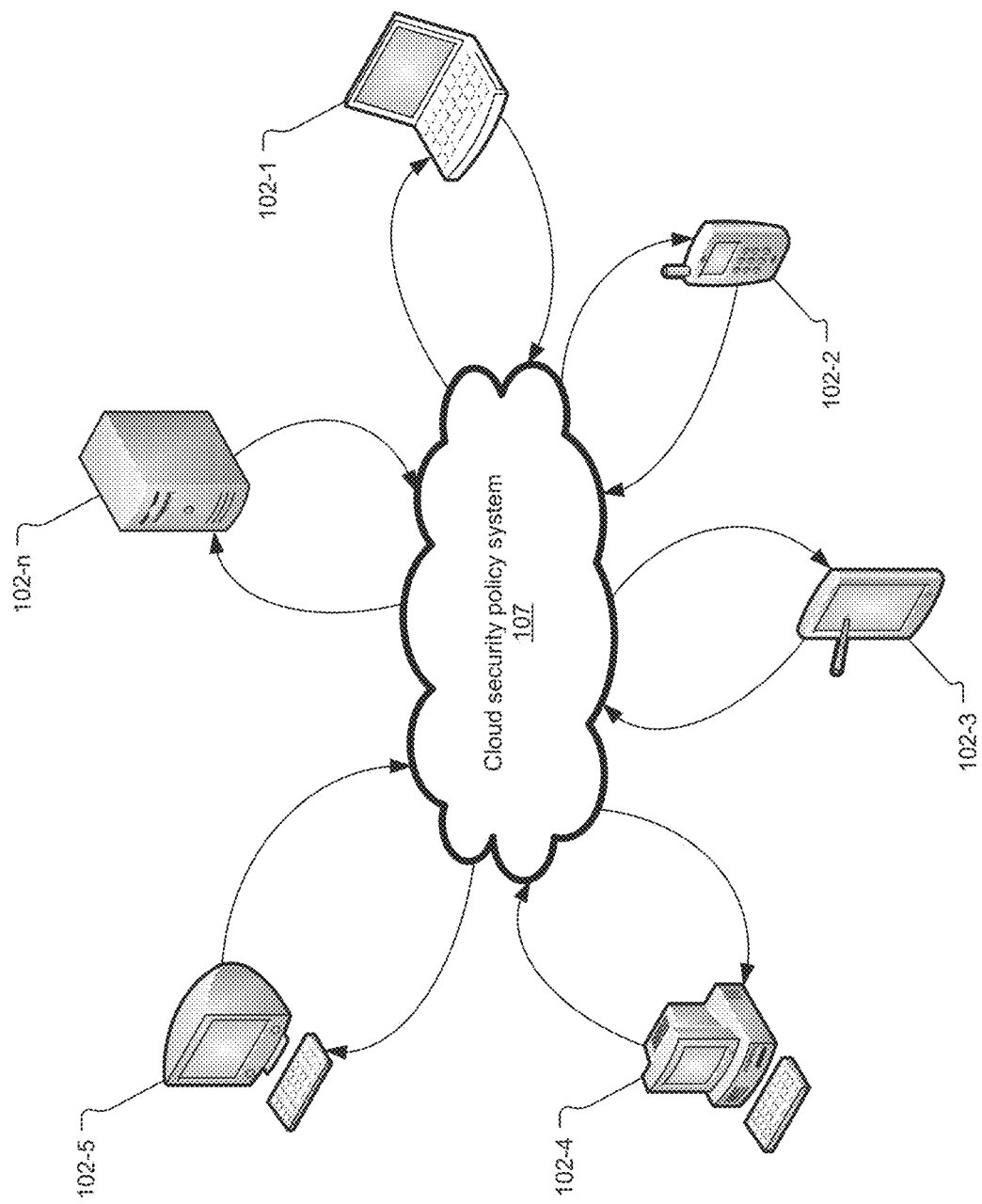
FIG. 1B is a block diagram illustrating the different user devices sending information to a cloud security policy system.

FIG. 1B is a block diagram illustrating user devices 102-1 to 102-n sending information to a cloud security policy system.

In a typical implementation, the cloud security policy system 107 utilizes crowd-sourcing to collect and analyze information about applications and/or files. That is, information received from all the user devices 102-1 to 102-n is used to determine the security policies for the applications and/or files. In the preferred embodiment, the user devices 102-1 to 102-n communicate with the cloud security policy system 107 via a networking protocol such as TCP/IP (Transmission Control Protocol/Internet Protocol).

In an alternative embodiment, individual messages (e.g. security policy requests and/or response messages) are sent using a stateless communication protocol such as UDP (or User Datagram Protocol), according to one implementation.

In a preferred implementation, the data transmitted between the user devices 102-1 to 102-n and the cloud security policy system 107 are encrypted and authenticated using common protocols such as SSL (Secure Socket Layer) or TLS (Transport Layer Security). In the case where UDP is used as the network transport, a correspondingly appropriate security protocol such as DTLS (Datagram Transport Layer Security) is used to secure the communications.

Figure 2:
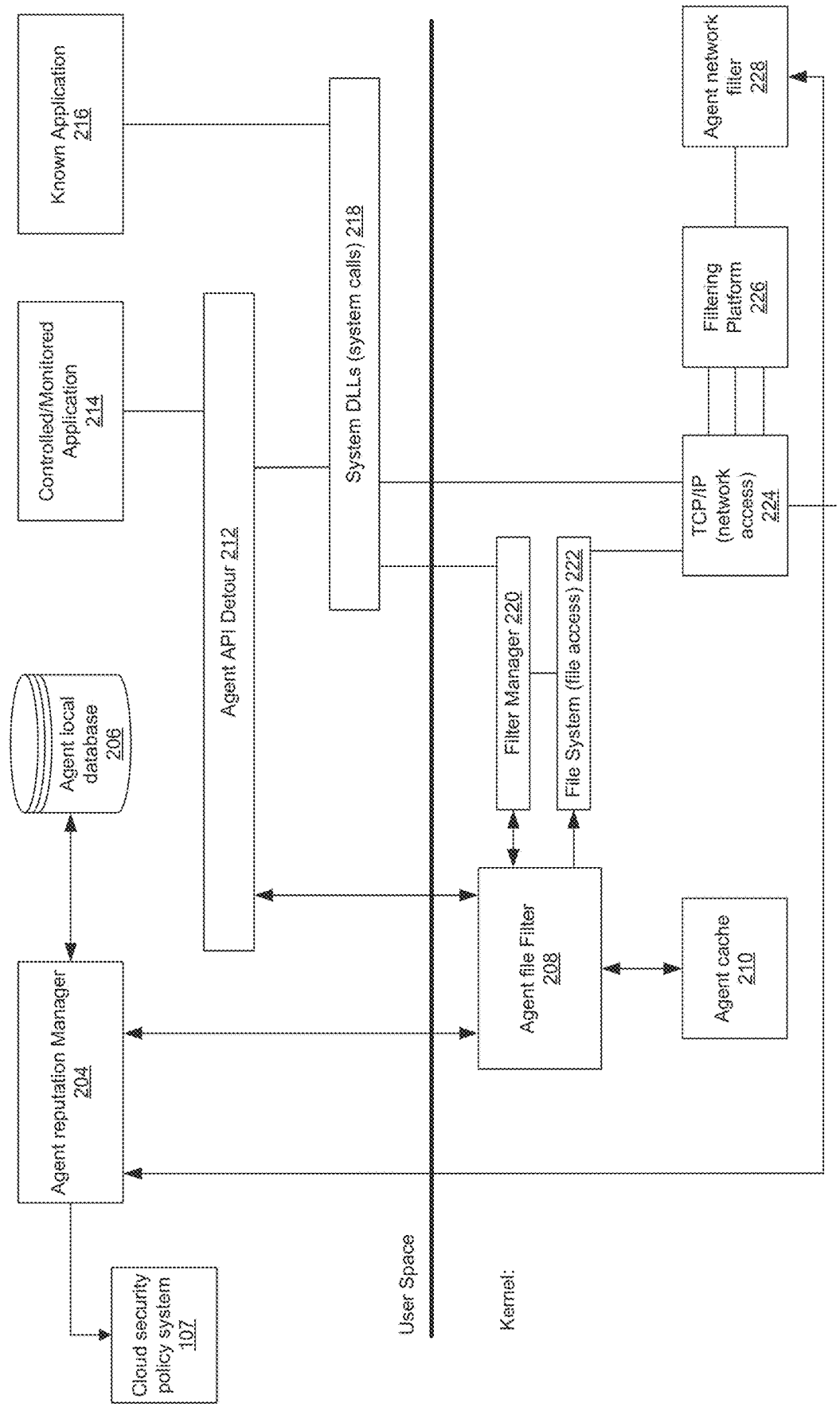
FIG. 2 is a block diagram of the agent security software architecture implemented on user devices.

FIG. 2 is a block diagram of the agent security software architecture that is implemented on the user devices 102-1 to 102-n.

The user devices 102-1 to 102-n operating system is usually divided between a user space and a kernel. Generally, the user space is reserved for user applications and the kernel manages processes, system memory, and hardware components of the user devices 102-1 to 102-n.

The illustrated example is for a Windows-based operating system sold by Microsoft Corp. Different operating systems generally have different kernels and different user spaces. Moreover, even different versions of the same operating system typically have different kernels. Thus, the way in which the kernel interacts with software of the user space and hardware of the user devices 102-1 to 102-n is different. These differences must be factored by the cloud security policy system 107 because different operating systems, kernels, and user spaces will have different vulnerabilities and malware programs that are dangerous for one may be harmless to another.

In the illustrated example, the user space includes the agent reputation manager 204 and agent local database 206, which manage and store security policies received from the cloud security policy system 107. The user space also includes an agent API (application program interface) detour 212, that intercepts API calls and resource requests made by applications being monitored (e.g., controlled monitored application 214). The agent API detour typically does not intercept application applications that are known (e.g., known application 216).

In the illustrated example, the kernel includes an agent file filter 208 and an agent cache 210, which are used to map filenames of applications to corresponding hashes and enforces security policies for applications and processes.

The kernel further includes device drivers, which enable software programs to interact with hardware of the user devices 102-1 to 102-n. For example, a filter manager 220 provides functionality required by filter drivers to monitor and control resource requests made to the file system. The file system 222 manages and organizes how data are used by the operating system. Some examples of file systems for Windows operating systems include File Allocating Table (FAT32) and New Technology File System (NTFS), to list some examples. Filter drivers are often optional drivers that are able to modify the behavior of a device. On user devices running an operating system such as Windows 7, filter drivers can be implemented for both file and network access. In the case where access control or content filtering needs to be performed on a file, the filter driver sits between an application and the underlying file system and has the ability to scan or restrict access to files based upon enforced security policy. For example, the file filter driver prevents an application (or executable) from being read, loaded into memory or executed if the file hash been identified as being malware in one example. This is accomplished by returning an "Access Denied" status code to the calling application when an attempt was made to access the resource, in one example.

In one specific example, Microsoft Corp. has provided sample code (via the MSDN and the WDK documentation), which implements a variety of File System Minifilter Drivers. One such example, the SCANNER minifilter explains how a filter driver can detect a file access or file creation, scan the contents of the data looking for a "sample virus pattern" and report relevant information to a user level service daemon. This example shows how anti-virus/malware software can detect file access and scan the contents for virus signatures.

A TCP/IP driver 224 enables the user devices 102-1 to 102-*n* to have network access. The kernel further includes a filtering platform 226, which is a set of API and system services that provide features that can be used by packet processing or other connection monitoring services (e.g., firewalls). The kernel also includes an agent network filter 228, which is able to monitor and track all network connections made on a per process basis. If the application file's hash was flagged by a security policy, network connections may be denied or terminated on a per process basis by returning a failure code to a caller indicating the request to access the resource (in this case the network) is denied (or blocked).

In one embodiment, content filtering on the network is used to block or filter spam, inappropriate web-sites or content, and malware being downloaded. Generally, anti-virus software is a form of content filtering because the software scans binary attachments in mail or files downloaded via the web and tries to find known virus signatures. Additionally, content filters may be implemented via software on individual computers or at a central point on the network, such as a firewall, internet router, or proxy server. Apache (by the Apache Software Foundation) is a commonly used, open sourced web server which may act as a proxy server and supports filtering. As data passes through a filter, a cryptographic hash is calculated for the data stream or attached file.

Figure 3A:
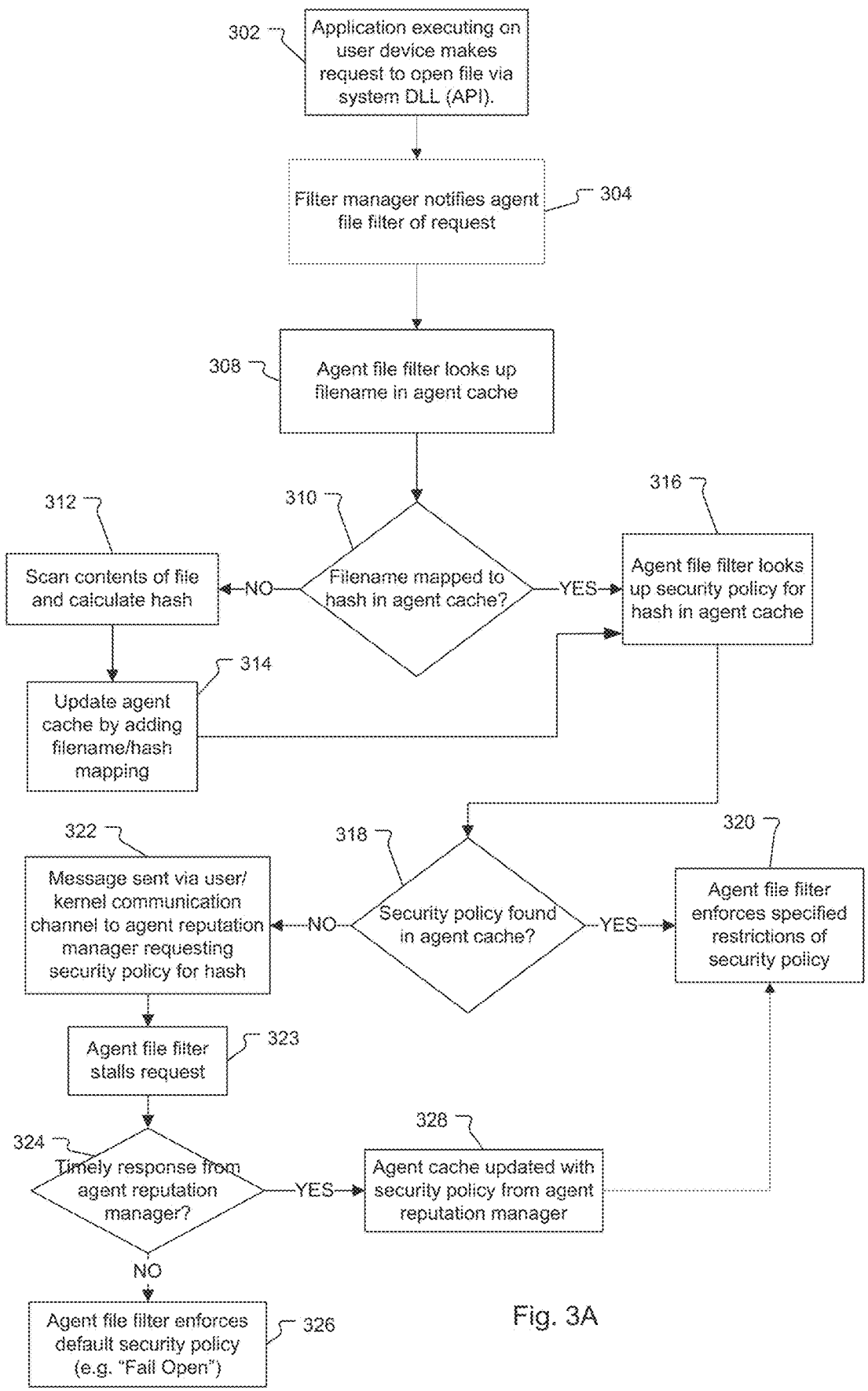
FIG. 3A is a flow diagram illustrating the steps performed by the agent file filters of the user devices to monitor applications executing on user devices.

FIG. 3A is a flow diagram illustrating the steps performed by the agent file filters 208 of the user devices 102-1 to 102-*n* to monitor applications executing on the user devices 102-1 to 102-*n*.

In general, the agent security software is responsible for detecting new files being created or accessed on the user devices 102-1 to 102-*n*. In a preferred embodiment, the agent security software implements utilizes the filter manager 220, which is capable of detecting a new file being created or files being accessed. The filter manager notifies the agent file filter, which reads the file and calculates a hash to uniquely identify the file. There are several well known cryptographic hashes such as MD5, SHA-1, and SHA-256, which are known in the art. A hash (or cryptographic) hash is a one-way deterministic function that takes an arbitrary stream of data (or message) and returns a fixed-sized string (a message digest or hash). Different streams of data always result in different and unique hashes, but the same stream or message always yields the same hash. This is important because filenames cannot always be relied upon to accurately identify a file.

Hash functions are often used for information security, providing integrity checks of data/information and providing digital signatures of the data, to list a few examples. Hashes have several useful characteristics such as it is not feasible to modify a message without changing the hash, it is impossible or at least very improbable to find two different messages with the same hash, and it is generally not possible derive the original message from the hash.

Additionally, reference implementations or binaries are also available to uniquely identify applications.

In the first step 302, an application executing on a user device (e.g. 102-1) makes a request to open a file via the system DLL (API). In the next step 304, the filter manager 220 notifies the agent file filter 208 of the request to open the file. Next, the agent file filter 208 looks up the filename of the file in the agent cache 210 in step 308.

If the filename is not mapped to a hash stored in the agent cache 210, then the agent file filter 208 scans the contents of the file and calculates a hash for the file in step 312. In the next step 314, the agent file filter 208 updates the agent cache 210 by adding the filename/hash to agent cache 210.

If the filename of the file is mapped to a hash in the agent cache 210 or the agent file filter 208 updated the cache by adding the filename to the hash, then the agent file filter 208 looks up a security policy for the hash in the agent cache 210 in step 316.

In the next step 318, the agent file filter 208 determines if the security policy is in the agent cache 210. If the security policy is in the agent cache 210, then the agent file filter 208 enforces the specified restrictions of the security policy in step 320.

If the security policy is not in the agent cache 210, then the agent file filter 208 sends a message via a user/kernel communication channel to the agent reputation manager 204 requesting the security policy for the hash in step 322. In the next step 323, the agent file filter 208 stalls while waiting for a response from the agent reputation manager 204.

In the next step 324, the agent file filter 208 determines if the response from the agent reputation manager is timely. If the response from the agent reputation manager 204 is not timely, then the agent file filter 208 enforces a default security policy (e.g., "Fail Open") in step 326. If the response from the agent reputation manager 204 is timely, then the agent cache 210 is updated with the security policy from the agent reputation manager 204 in step 328. In the next step 320, the agent file filter 208 enforces the security policy enforcement actions of the security policy.

Figure 3B:
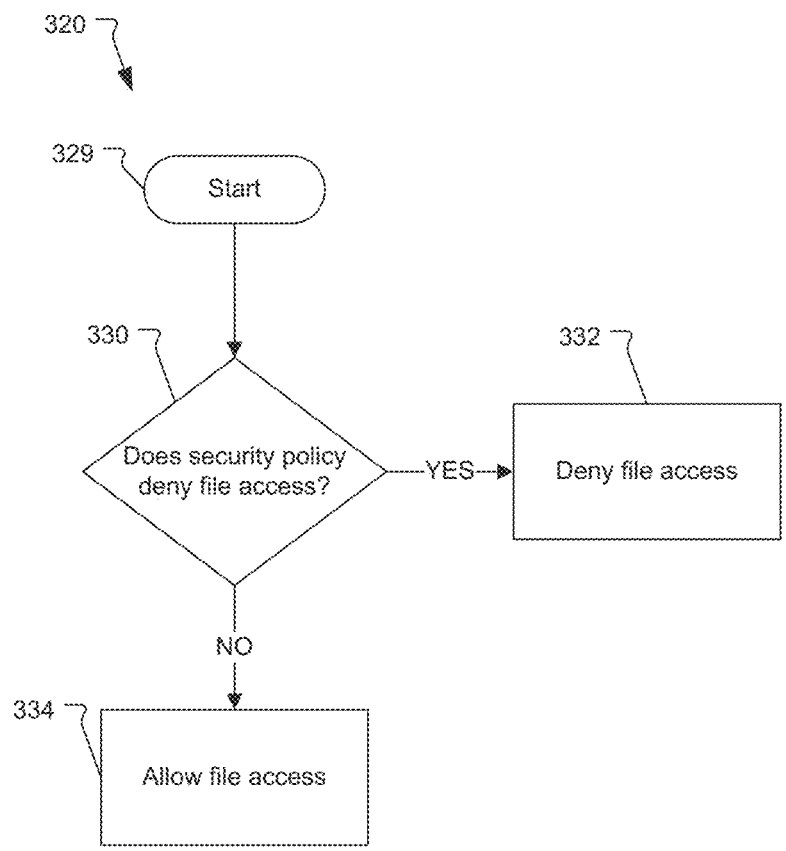
FIG. 3B is a flow diagram illustrating how security policies are enforced on the user devices by the agent file filter.

FIG. 3B is a flow diagram illustrating how security policies are enforced on the user devices by the agent file filter 208 (step 320 of FIG. 3A).

In the first step 330, the file filter 208 determines if the security policy denies file access. If the security policy denies file access, then the agent file filter 208 denies the application file access in step 332. If the security policy does not deny file access, then the agent file filter 208 allows file access in step 334.

Figure 3C:
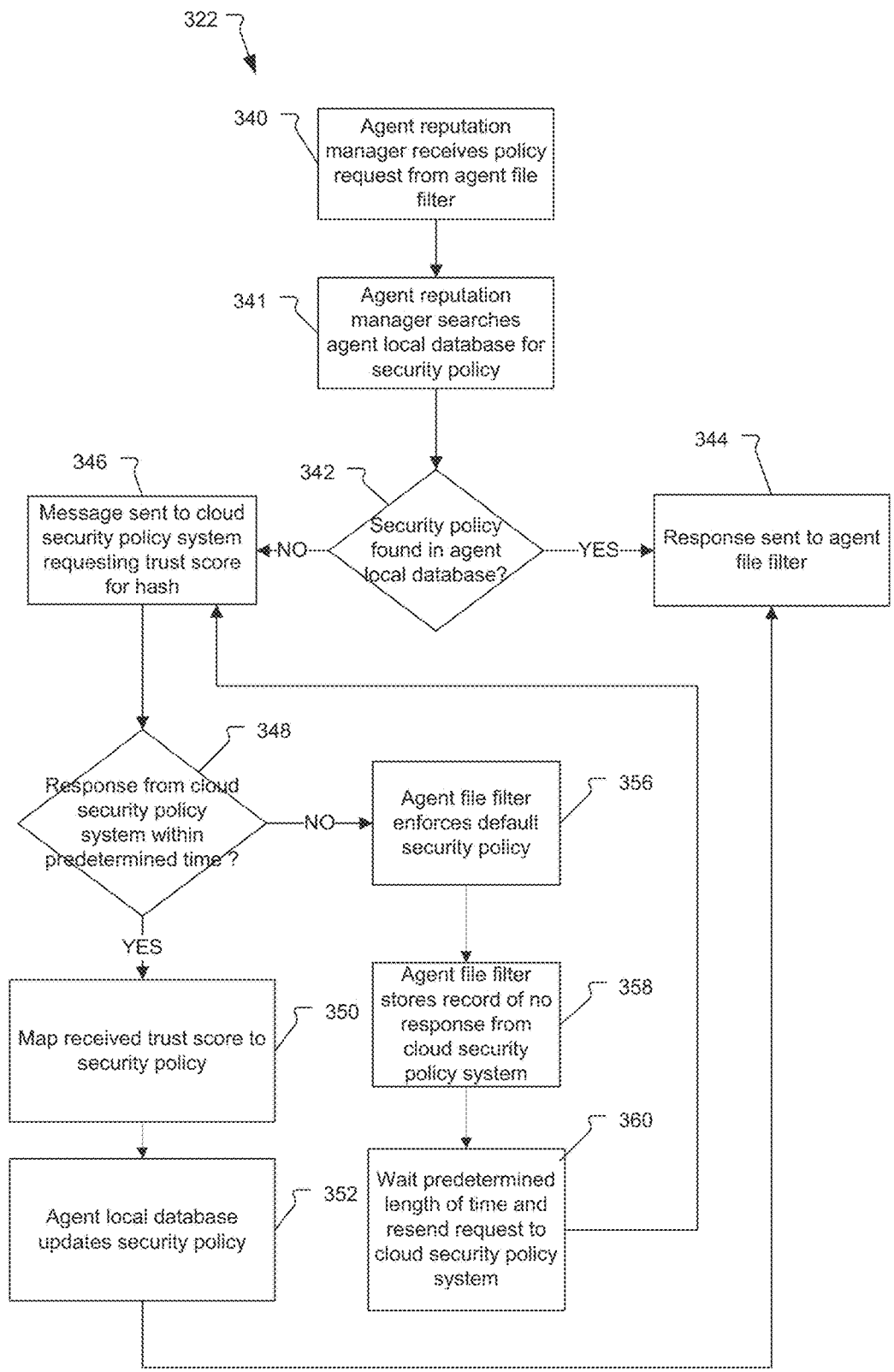
FIG. 3C is a flow diagram illustrating the steps performed by an agent reputation manager to locate and enforce security policies for the user devices.

FIG. 3C is a flow diagram illustrating the steps performed by an agent reputation manager 204 to locate and enforce a security policy for an application executing on one of the user devices (step 322 of FIG. 3A).

In the first step 340, the agent reputation manager 204 receives security policy requests from the agent file filter 208. In the next step 341, the agent reputation manager 204 searches the agent local database 206 for the requested security policy of the hash. In the next step 342, the reputation manager determines if the security policy is in the agent local database 206. If the security policy is in the agent local database 206, then the reputation manager sends the security policy for the hash to the agent file filter 208 in step 344.

If the security policy is not found in the agent local database 206, then the reputation manager 204 sends a message to the cloud security policy system 107 requesting a trust score (or reputation score) for the hash of application in step 346. In the next step 348, the reputation manager 204 determines if a response from the cloud security policy system 107 is received within a predetermined length of time. If there is no response from the cloud security policy system 107 within a predetermined length of time, then the agent file filter 208 enforces a default security policy for the application in step 356. The default security policy provides enforcement actions and application restrictions for monitored applications.

In the next step 358, the agent file filter 208 stores a record of the failed response from the cloud security policy system 107. Next, in step 360, the agent reputation manager 204 waits a predetermined length of time and resends the request to the cloud security policy system 107.

If the response from the cloud security policy system 107 is received within the predetermined length of time, then the agent reputation manager 204 maps the received trust score to the security policy in step 350. In the next step 352, the agent local database 206 is updated with the security policy. In the final step 344, the response is sent to the agent file filter 210, which updates the agent cache 210 and enforces the security policy.

Figure 4:
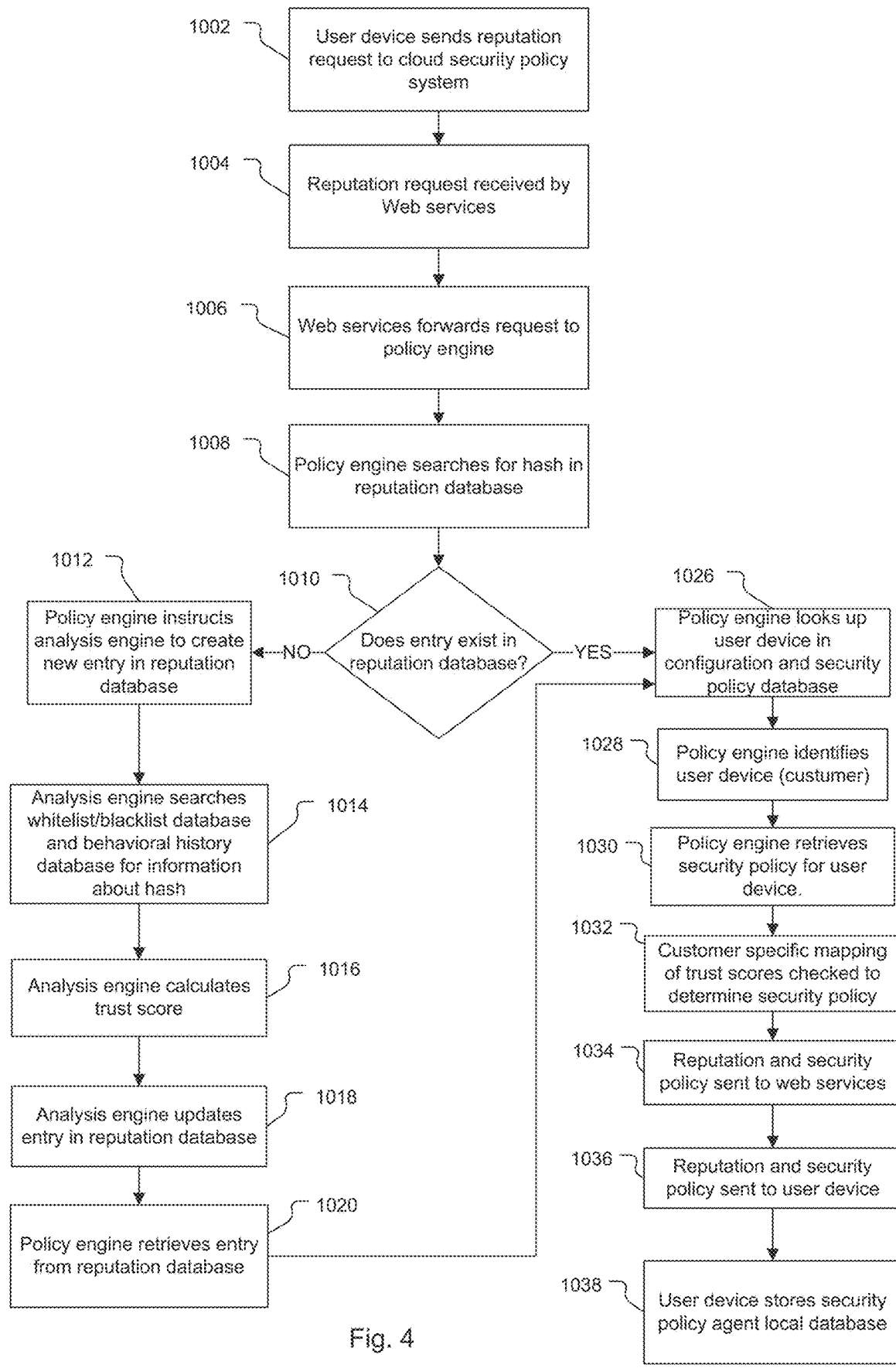
FIG. 4 is a flow diagram illustrating the steps performed by the cloud security policy system to handle reputation requests from the user devices.

FIG. 4 is a flow diagram illustrating the steps performed by the cloud security policy system 107 to handle requests from the user devices 102-1 to 102-n.

In the first step 1002, the user devices 102-1 to 102-n send reputation requests for hashes to the cloud security policy system 107. In the next step 1004, the reputation requests are received by the web services component 108. The web services component 108 forwards the reputation requests to the policy engine 110 in step 1006. In the next step 1008, the policy engine 110 searches for the hashes in the reputation database 116.

In the next step 1010, the policy engine 110 determines if entries for the hashes exist in the reputation database 116. If the entries do not exist in the reputation database 116, then the policy engine 110 instructs the analysis engine 114 to create new entries in step 1012. Next, in step 1014, the analysis engine 114 searches the whitelist and blacklist database 120 and behavioral history database 118 for additional information about hashes for additional information that can be used to calculate trust scores for the hashes.

In the next step 1016, the analysis engine 114 calculates the trust scores for the hashes. In the next step 1018, the analysis engine updates the entries in the reputation database 116 with the trust scores. In the next step 1020, the policy engine 110 retrieves the entries from the reputation database 116.

If the entries exist in the reputation database 116 (or after the policy engine 110 retrieves the entries from the reputation database in step 1020), the policy engine 110 searches for the user devices 102-1 to 102-n in the configuration and security policy database 112 in step 1026. In the next step 1028, the policy engine 110 identifies the user devices 102-1 to 102-n and a customer associated with each user device. In the next step 1030, the policy engine 110 retrieves the security policies for each user device. Next, in step 1032, customer specific mapping of the trust scores are checked to determine the security policy enforcement actions of the security policies. In a typical implementation, the enforcement actions of the security policies are user device (or customer) specific. Thus, identical trust scores result in different enforcement actions for different user devices 102-1 to 102-n, in one implementation.

In the next step 1034, the trust scores and security policies are sent to the web services component 108. In the next step 1036, the trust scores and security policies are sent back to the user devices 102-1 to 102-n. Lastly, the user devices 102-1 to 102-n store the user specific security policies and trust scores in the agent local databases 206 and the agent caches 210 in step 1038 and then enforce those security policies.

Figure 5A:
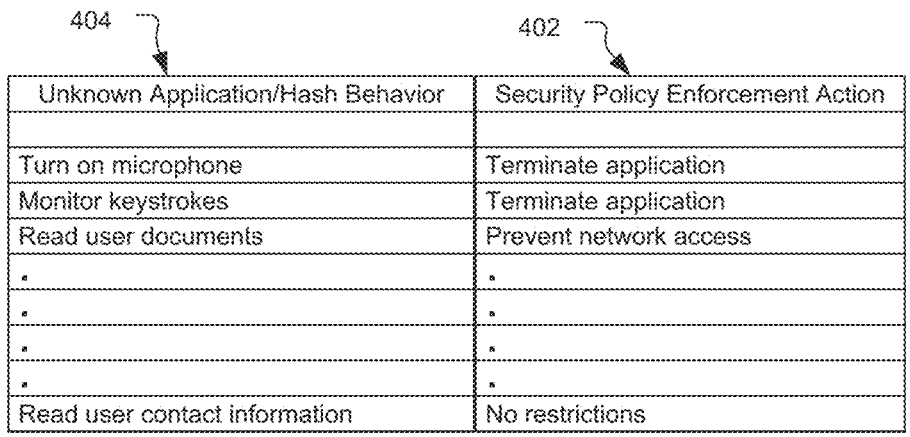
FIG. 5A is a table illustrating an example of mapping between unknown applications/hash behaviors and security policy enforcement actions.

FIG. 5A is a table illustrating an example of mapping between unknown applications/hash behaviors and default security policy enforcement actions.

In the illustrated example, security policy enforcement actions 402 are mapped to behaviors of unknown applications/hashes 404. In a typical implementation, the behaviors and corresponding enforcement actions are customizable for different user devices. For example, if an unknown application turns on a microphone or monitors keystrokes of user devices 102-1 to 102-n, then the corresponding enforcement action implemented by the agent security software is to terminate the application. This is because the unknown application is performing actions that are typically performed by malicious software or malware.

In another example, if an unknown application attempts to read user documents (which could be malicious or benign), then the corresponding enforcement action is to prevent network access for the unknown application. Lastly, other actions such as reading user contact information are not restricted in any way.

Figure 5B:
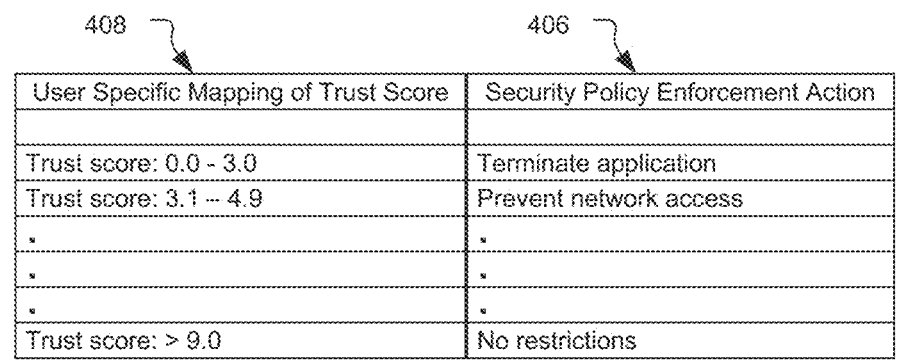
FIG. 5B is a table illustrating an example of mapping between user specific trust scores and security policy enforcement actions.

FIG. 5B is a table illustrating an example of mapping between user specific trust scores and security policy enforcement actions.

In the illustrated embodiment, default security policy enforcement actions 406 are based on trust scores 408 of the applications/hashes. Rather than having security policy enforcement actions for specific behaviors, the security policy enforcement actions correspond to calculated trust scores of the applications/hashes.

For example, trust scores between 0.0 and 3.0 result in termination of the application. Trust scores between 3.1 and 4.9 result in prevention of network access for the unknown application. And trust scores greater than 9.0 result in no restrictions for the unknown application.

In a typical embodiment, security policy enforcement actions are also based on crowdsourcing, which helps reduce false positives by collecting and analyzing behavioral information from a large number of user devices (or companies). The cloud security policy system is able to identify unknown and/uncommon applications (based upon crowdsourcing as well as a centralized list of known applications). This allows it to reduce False Positives when analyzing behaviors and in applying security. Using this approach, the system can identify the good applications and focus on the unknown or bad ones.

For example, if only one company is reporting (or requesting trust scores) about an unknown application, the security policy enforcement action is to terminate the application. In another example, if the total number of companies reporting about an unknown application is 3 or less, then the application associated is not permitted to access user documents or sensitive data (e.g. database files or financial records). In another example, if unknown applications are not widely used (e.g. on fewer than 1000 user devices) across all companies, the applications are prevented from accessing the network according to one policy example. In another example, if the age of the unknown application is less than 1 week, then the application is not able to access any networks or make any network connection. Additionally, this crowdsourcing information is also used to calculate the trust scores for the applications.

Figure 6A:
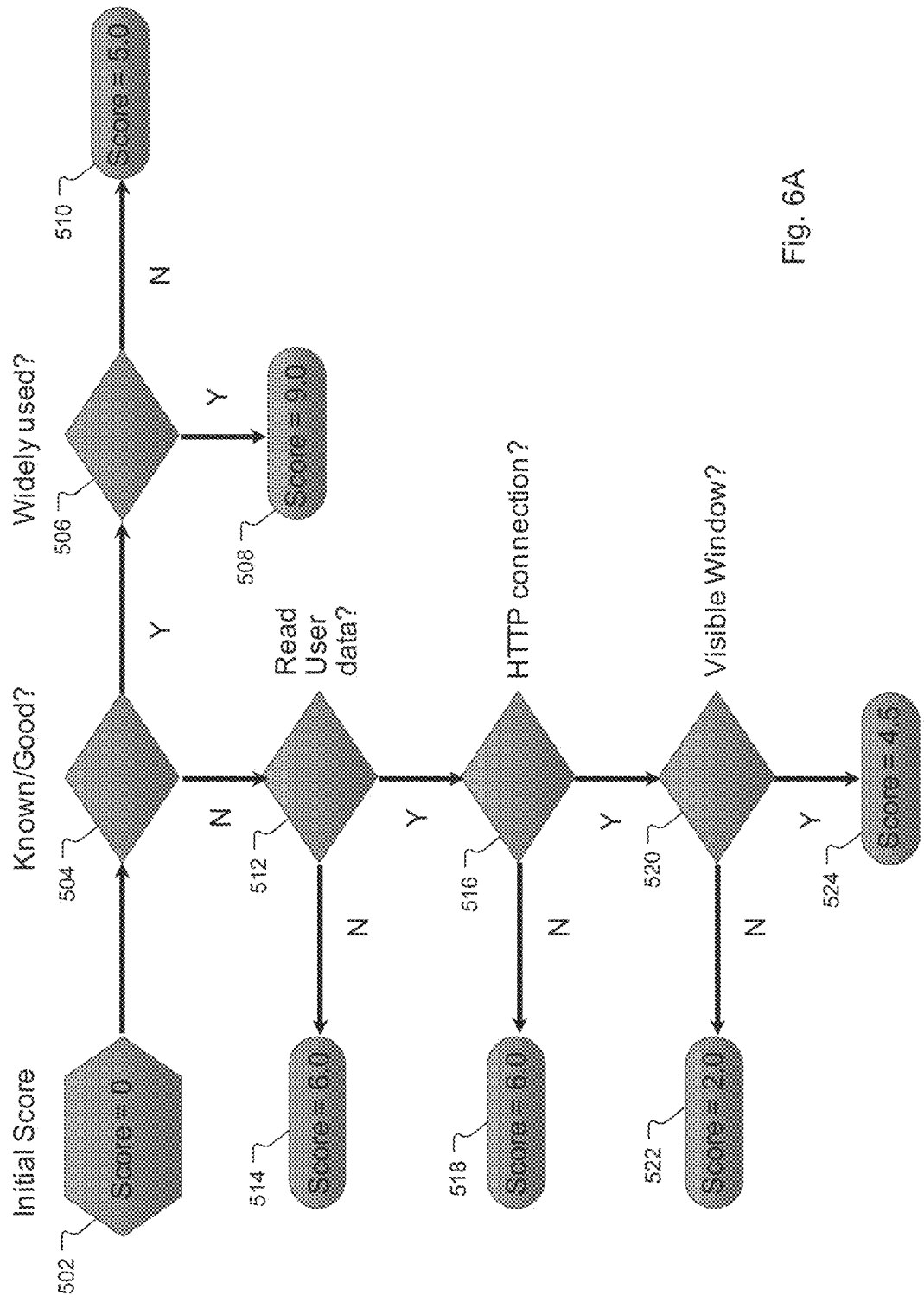
FIG. 6A is a flow diagram illustrating an example of how trust scores are calculated for unknown applications.

FIG. 6A is a flow diagram illustrating an example of how trust scores are calculated for unknown applications/hashes.

Trust scores are numeric representations used to determine the trustworthiness of unknown applications. In a current implementation, the higher the trust score, the more trustworthy an application is considered. Conversely, lower trust scores indicate a greater chance that the application is malware. In the illustrated example, the scale is from 0-10 (with one decimal place). Alternate embodiments, however, could implement different scales with greater or finer increments and/or utilize a larger or smaller scale.

In the illustrated example, combinations of observed behaviors and/or the absence of expected behaviors are used to calculate the trust score for unknown applications. For example, in the first step 502, the unknown application (or its hash) is assigned an initial score of 0.0. In the next step 504, the analysis engine 114 determines if the unknown application is known/good. If the application is a known/good application, then the analysis engine 114 determines if the application is widely used in step 506. Additionally, if the application is known/good, then the application is no longer "unknown", but the application could still be malware. Thus, if the application is not widely used, then the unknown analysis engine 114 assigns the application a score of 5.0 in step 510.

Alternatively, if the application is widely used, then the analysis engine 114 assigns the application a score of 9.0 in step 508. The discrepancy in trust scores for known applications that are widely used versus known applications that are not widely used is because it is possible for malware to be added onto a Whitelist (e.g. "gaming" the system and compromising the whitelist database). The different scores for how widely used the application is provides a greater chance of detecting whether the application is malware.

If the unknown application is not known/good, then the analysis engine 114 determines if the unknown application reads user data in step 512. If the unknown application did not read user data, then the analysis engine 114 assigns a score of 6.0 in step 514. If the unknown application reads user data, then the analysis engine 114 determines if an HTTP (Hypertext Transfer Protocol) connection was made in step 516. If the unknown application did not make an HTTP connection, then the analysis engine 114 assigns a score of 6.0 in step 518. If the unknown application makes an HTTP connection, then the analysis engine 114 determines if a visible window is displayed in step 520.

If the unknown application did display a visible window, then the analysis engine 114 assigns a score of 4.5 in step 524. If the unknown application did not display a visible window, then the analysis engine 114 assigns a score of 2.0 in step 522. This is an example of how the absence of an expected behavior causes the trust score to be affected (e.g., lowered).

In an alternative embodiment, the analysis engine 114 could also check to see if the application performed other actions such as turning on microphones, turning on webcams, accessed databases, or recorded keystrokes, to list a few examples.

Additionally, points may be added to the trust scores based on other factors such as the age of the application (how long the application has existed), the number of devices and/or companies reporting on the application, static information about the file or code (e.g. filename, publisher, and whether the application is signed), to list a few examples. Additionally, contextual information about the application file can also affect the trust score. For example, what the application created or downloaded the file, where the file was downloaded from (e.g., from USB, from a remote network peer, or overseas website), and the behavior exhibited by the code of the application as it executes on the user devices 102-1 to 102-$n$ (e.g. network connections, system API calls, files accessed, and user inputs monitored), to list some examples.

Other methods may be used to calculate the trust score. By way of a simple example, if there is only one company reporting on the application, then zero points are added to the trust score. If the number of companies reporting an application is 10 or less, then add 2.5 points to the trust score. If the number of companies reporting on the application is greater than 10, then add 5.0 points to the trust score.

In another example, if the application's age is less than 1 day, then add zero points to the trust score. If the application's age is less than 1 week, then add 0.5 points to the trust score. If the application's age is less than 1 month, then add 1.0 points to the trust score. If the application's age is greater than a month, then add 3.0 points to the trust score.

In yet another example, if there is only one user device reporting the application, then add zero points to the trust score. If the number of user devices 102-1 to 102-$n$ reporting the application is 1000 or less, then add 1.0 points to the trust score. If the number of user devices 102-1 to 102-$n$ reporting the application is greater than 1000, then add 2.0 points to the trust score.

In an alternative embodiment, other methods to calculate the trust score are implemented. In one example, the trust score is statically assigned by a data flow terminator or incrementally modified as each node is evaluated in a decision tree. In this embodiment, the trust scores may be a fixed value, variable value, dependent upon the current node in the data flow, dependent upon the behavior being evaluated at that point in the decision process, or dependent upon the probability that the intent is malicious or not (e.g., via a Bayesian Network).

In the preferred embodiment, observed behaviors of the applications are run through multiple and possibly different behavioral models designed to search for different behaviors. The different behavioral models search for behaviors such as the "intent" of the applications, data theft by the applications, or indicators that the application operating as part of a botnet, to list a few examples. If multiple trust scores are calculated for the application, then the analysis engine 114 is able to choose which trust score to use when selecting a security policy for an application. Typically, the analysis engine 114 selects the lowest calculated trust score.

For example, when the behaviors of the applications are modeled against botnet behaviors, the behaviors of the applications may not exhibit the behaviors of a botnet and thus receive a higher trust score. When the behaviors of the applications are modeled against behaviors of data theft, the behaviors may match the behaviors of data theft and thus receive a lower score. Thus, the analysis engine 114 selects the lower score to indicate a higher possibility of malware directed to data theft.

In the preferred embodiment, trust scores score are generated for specific behaviors on a single user device or for behaviors on an aggregate set of user devices (i.e. where an application running on multiple user devices exhibits a specific type of behavior). If the trust score is generated for the aggregate set of user devices, then the behaviors do not need to occur on every user device. The behaviors only need to occur on enough user devices for the cloud security policy system 107 to determine that the behavior is representative. This results in both an "incident" score for the specific devices and well as a "collective" trust score based on aggregated data. To provide an example, the analysis engine 114 typically selects the lower score for policy enforcement. In another embodiment, both the "incident" and "collective" scores are available for use in enforcing security policies. Typically, multiple sets of different user devices 102-1 to 102-n are used in calculating more than one aggregate or "collective" trust score. The user devices 102-1 to 102-n, which are evaluated in a specific aggregation of data, typically include a single company, a vertical or companies in a similar business, an arbitrary collection of users or companies, a geographic collection of user devices, or a global collection of user devices, to list a few examples.

In the preferred embodiment, the trust scores for the applications running on the user devices 102-1 to 102-n help calculate the trust score for the user device itself. This score represents the "trustworthiness" of the device itself (in totality). Additionally, this score may be used in controlling access to cloud or network based services, admission to specific networks, compliance enforcement, or risk rating, to list a few examples.

FIG. 6B is a table illustrating how actions of unknown applications are compared to actions performed by malware and trusted applications to determine the trustworthiness of the unknown applications.

In some embodiments, the cloud security policy system 107 uses statistical analysis to identify behavior exhibited by malware. In the illustrated example, a set of "control" data is identified, which may be common to both a trusted applications and malware. In this case, both applications may, for example, "read user data" (e.g. a word document) and make a network connection using HTTP.

Another set of data (the "variance" data set) identifies behavior of the applications, which statistically vary (or are measurably different) between trusted applications and malware. The behavior is typically a combination of observed behaviors as well as the absence of expected behaviors. In the illustrated example, the behavior is whether or not the application displayed a "visible window." For trusted applications, a "visible window" was displayed 98% of the time. In the case of malware, a "visible window" was displayed only 15% of the time.

Examining "Unknown App 1", the behaviors of the unknown application match the behavior of the control data. Looking at the variance behavior, a "visible window" was not displayed. And given the statistical divergence between the trusted applications and malware, the "unknown app 1" is more likely to be "Malware" than a trusted application because its behavioral profile is similar to malware.

In addition to the "control" and "variance" data sets, the behavior model also collects additional "unmodeled" data about the applications. The additional "unmodeled" data includes network connections, types of file access and/or creation, changes to the system configurations (e.g. Windows registries), and system or application API calls, to list a few examples. While these behaviors may or may not be malicious, monitoring which applications exhibit these behaviors help the model to evolve over time with the malware. In one embodiment, new malware behavior is learned and malware applications are identified based upon the "variance". The "unmodeled" behavior which has also been collected may then be compared between Trusted applications and known malware to detect other behavioral outliers. For example, calls to a specific system API (e.g., SysAPI call Y) are statistically similar with malware and the trusted application. Thus, there is nothing to distinguish a trusted application from malware (using that control set). Therefore, whether the application makes SysAPI call Y will not factor into trust scores, in one example. Conversely, modifications to a specific Registry Key Value (Key X), are more likely in Malware than in a trusted application. This learned behavior may transition and be included as a known "variance" to identify Malware (using this control set) in future analysis. Thus, the model is able to evolve over time with evolving malware.

Examining "Unknown App 2", the behaviors of the unknown application match the behavior of the control set. Looking at the variance, a "visible window" was displayed. Thus, the application initially appears to be a trusted application. However, if the "learned" behavior (modification of the "Registry Key X") is factored in as a "variance", then the analysis may indicate that the "Unknown App 2" is more likely to be malware.

In some cases the mere presence of variance data (irrespective of the control set) may be indicative of malware. For example, the modification of Registry Key X combined with an HTTP connection typically indicates malware. Thus, regardless of other behaviors, if an unknown application performs these behaviors it is determined to be malware.

Alternatively, the combination of control and variance behavior could be viewed as a new behavioral model, where both behaviors are considered the "control" set of data indicating malware.

In an alternative embodiment, a set (or a subset) of behaviors exhibited by a specific instance of malware are used to identify polymorphic variations of the specific instance malware. That is, observed behavior of malware is able to be used as a fingerprint to identify the malware. In the case of polymorphic viruses, files that appear to be different (based upon a hash of the file) will exhibit the same set of observed behaviors as the malware. Thus, the set (or subset) of behaviors is able to identify the polymorphic virus. Additionally, behavioral fingerprints are also able to identify unique applications (e.g. applications that only occur on a single device) which exhibit the same behavior and are likely malware.

Figure 7:
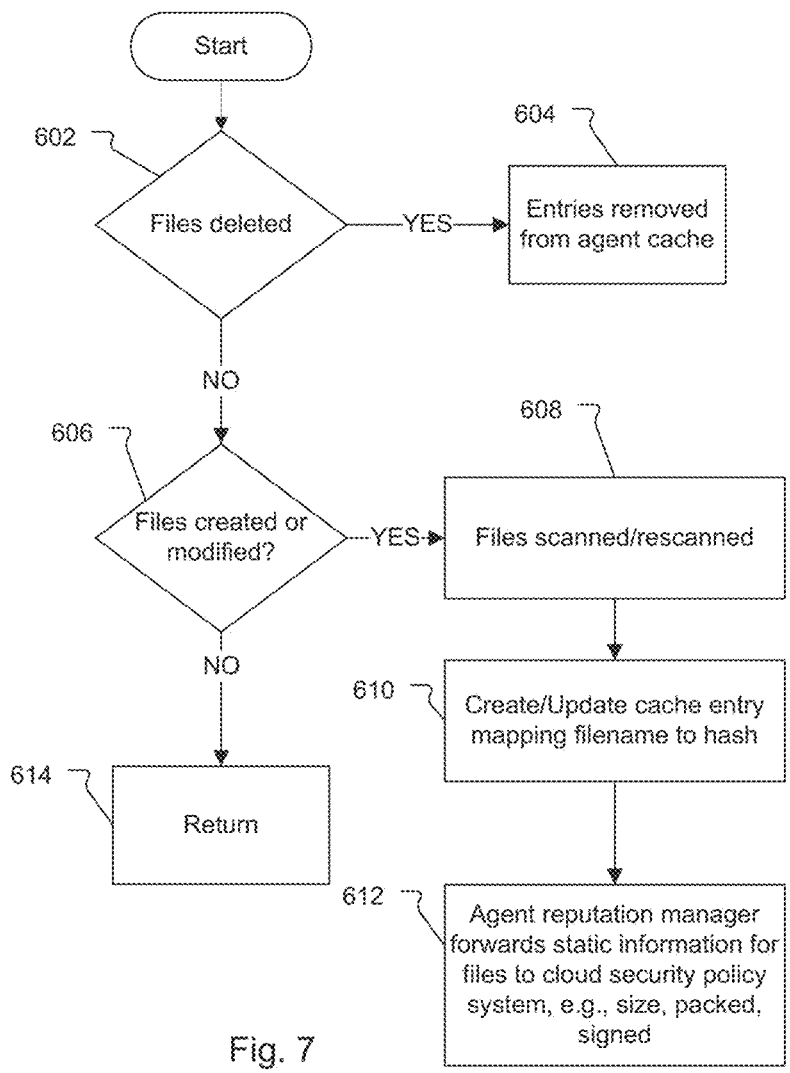
FIG. 7 is a flow diagram illustrating the steps performed by the agent file filter during scans of the user devices to determine if files has been created, deleted, or modified.

FIG. 7 is a flow diagram illustrating the steps performed by the agent file filter 208 during background scans of the user devices 102-1 to 102-n to determine if files have been created, deleted, or modified.

If files have been created or modified, then it is likely that their corresponding filenames and hashes have also changed. Additionally, the agent cache 210 (possibly the agent local database 206) needs to be updated to reflect these changes.

In the first step 602, the agent file filter 208 determines if files have been deleted. If the files have been deleted, then corresponding entries are removed from the agent cache 210 in step 604. If files have not been deleted, then the agent file filter 208 determines if any files have been created or modified in step 606.

If any files have been created or modified, then the agent file filter 208 scans (or rescans) the created or updated files in step 608. In the next step 610, the agent file filter 208 updates the entries in the agent cache 210 and maps the filename of the updated files to the hash in the agent cache 210. In the next step 612, the agent reputation manager 204 forwards static information about the files to the cloud security policy system 107. Static information often includes the size of the file, whether the file/executable is "packed", or whether the file/executable is "signed" (and by what certificate authority), to list a few examples.

In alternative embodiments, other methods for detecting new (or updated) files on user devices 102-1 to 102-n are implemented. For example, application plugins, which are often present in web browsers, are able to detect when a file is being downloaded. Alternatively, another method includes using a service daemon, which performs a background scan of the disk, to search for files which have modified timestamps or file sizes.

Figure 8:
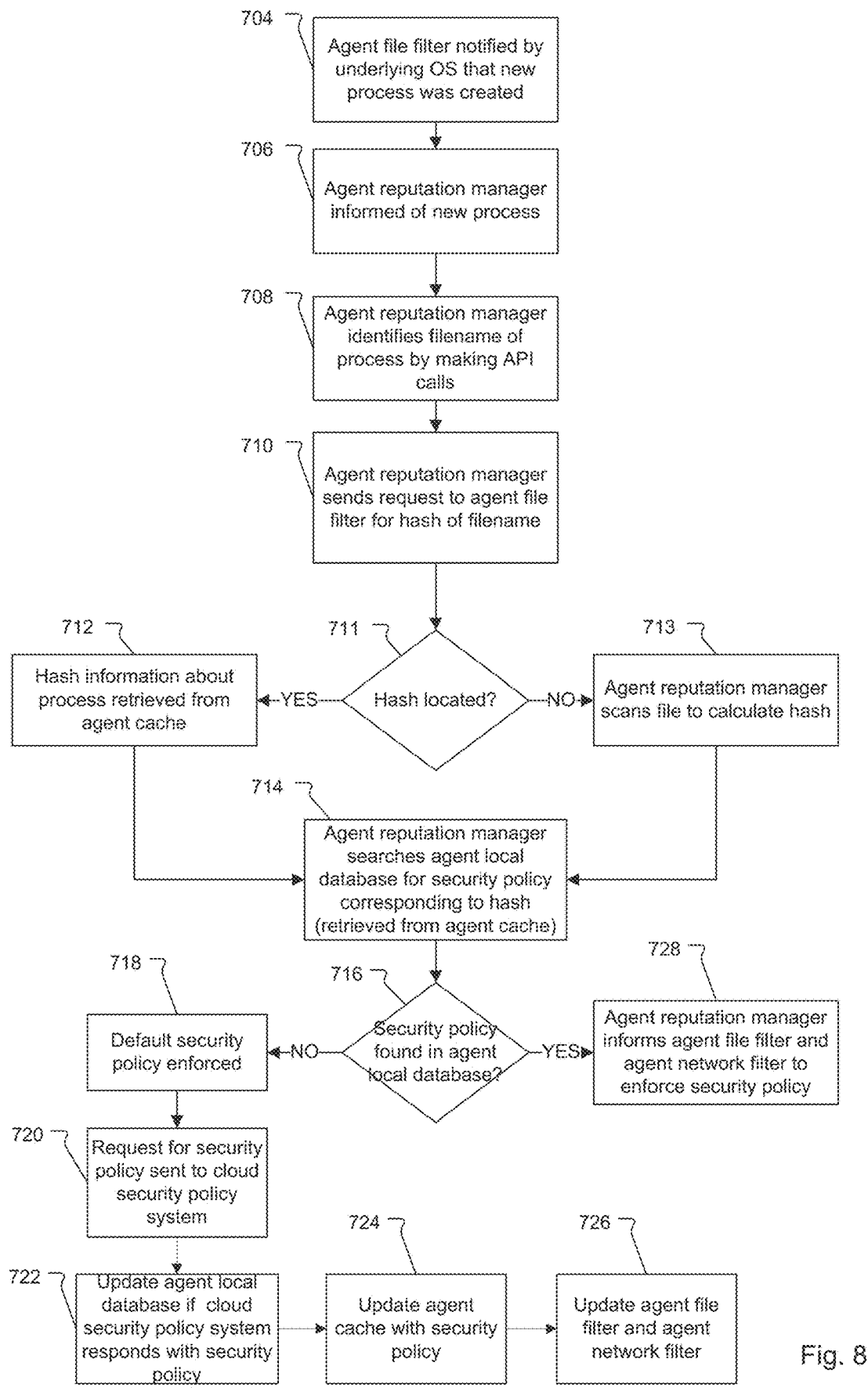
FIG. 8 is a flow diagram illustrating the steps performed by the agent reputation manager to monitor processes executing on the user devices.

FIG. 8 is a flow diagram illustrating the steps performed by the agent reputation manager 204 to monitor processes executing on the user devices 102-1 to 102-n.

In the first step 704, the agent file filter 208 is notified by the operating system that a new process was created. In the next step 706, the agent reputation manager 204 is informed by the agent file filter 210 of the new process. In the next step 708, the agent reputation manager 204 identifies the filename of the process by making API calls. Next, in step 710, the agent reputation manager 204 sends a request to the agent file filter 210 for the hash of the filename of the created process. In the next step 711, the agent file filter 208 searches for the hash in the agent cache 210. If the agent file filter 208 is not able to locate the hash in the agent cache 210, then the agent reputation manager 204 scans the file to calculate a hash in step 713. If the agent file filter 208 is able to locate the hash in the agent cache, then the agent reputation manager 204 retrieves the hash information from the agent cache 210 in step 712.

In the next step 714, the agent reputation manager 204 searches the agent local database 206 for a security policy corresponding to the hash, which is retrieved from the agent cache 210. In the next step 716, the agent reputation manager 204 determines if the security policy was found in the agent local database 206. If the agent reputation manager 204 locates the security policy in the agent local database 206, then the agent reputation manager 204 informs the agent file filter 208 and the agent network filter 228 to enforce the security policy in step 728.

If the agent reputation manager 204 is not able to locate the security policy in the agent local database 206, then the agent reputation manager 204 enforces a default security policy in step 718. In the next step 720, the reputation manager 204 sends a request for a security policy (corresponding to the hash) to the cloud security policy system 107. In the next step 720, the reputation manager 204 updates the agent local database 206 if the cloud security policy system 107 responds with a security policy.

In the next step 724, the agent cache 210 is updated with the security policy. Next, in step 726, the agent file filter 208 and agent network filter 228 are updated with the security policy.

Figure 9:
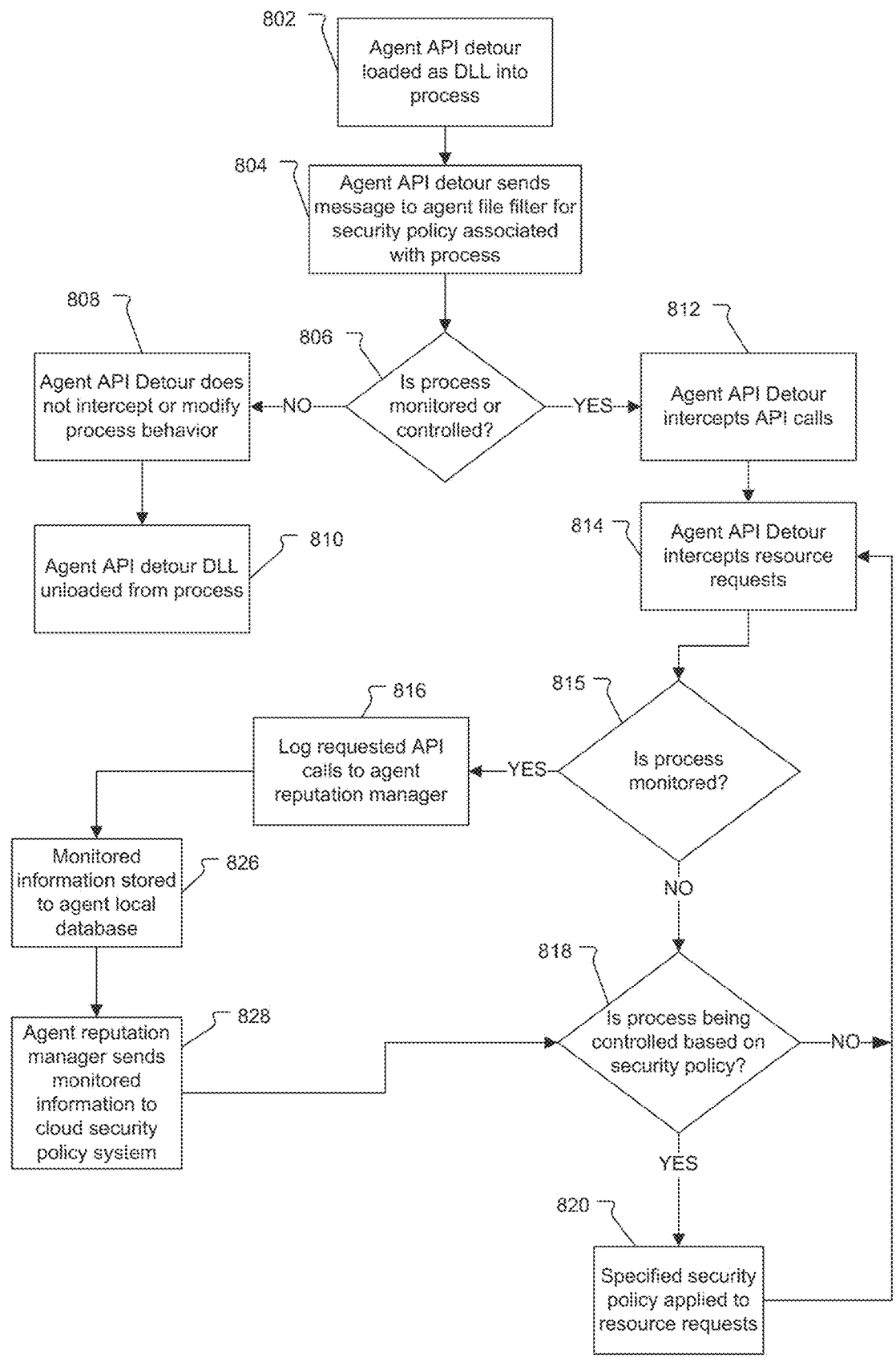
FIG. 9 is a flow diagram illustrating how processes are monitored and/or controlled by the reputation manager.

FIG. 9 is flow diagram illustrating how processes are monitored and/or controlled by the reputation manager 204.

In the first step 802, the agent API detour 212 is loaded as a DLL into the process. In the next step 804, the agent API detour 212 sends a message to the agent file filter 208 for a security policy associated with the process. The agent file filter 208 then determines if the process is monitored or controlled in step 806. If the process is not monitored or controlled, then the agent API detour 212 will not intercept or modify process behaviors in step 808. In the next step 810, the agent API detour DLL may be unloaded from the process.

If the process is monitored or controlled, then the agent API detour 212 intercepts API calls from the process in step 812 using software such as the Microsoft Detours product. In the next step 814, the agent API detour 212 intercepts resource requests from the process.

Next, in step 815, the agent file filter 208 determines if the process is being monitored. If the process is being monitored, then the agent API detour 212 logs requested API calls to agent reputation manager 204. In the preferred embodiment, this is accomplished by sending a message via the agent file filter 208. In other embodiments, the monitored information is passed directly to the reputation manager 204. Alternatively, the monitored information is stored in a log file, syslog, or an NtEvent Log, to list a few examples. Then the monitored information is read in by the reputation manager. In the next step, the reputation manager 204 stores the monitored information to agent local database 206. Then, the agent reputation manager 204 sends the monitored information to cloud security policy system 107 in step 828.

In the next step 818, or if the process is not being monitored (from step 815), then the agent file filter 208 determines if the process is being controlled based on a security policy. If the process is not being controlled based on the security policy, then agent API detour intercepts resource requests in step 814. If the process is being controlled based on a security policy, then the restrictions within the security policy are applied to the resource requests in step 820. The restrictions include the agent network filter 228 preventing network connections, in one implementation. Alternatively, the process being controlled is terminated (in the case where the security policy indicates the application is not allowed to run). Typically, the application is terminated by either the reputation manager 204 or the agent file filter 208 terminating the process (operating in a privileged context). Alternatively, the application is terminated by indicating the security policy to the agent API detour 212, which causes the process to exit.

Figure 10A:
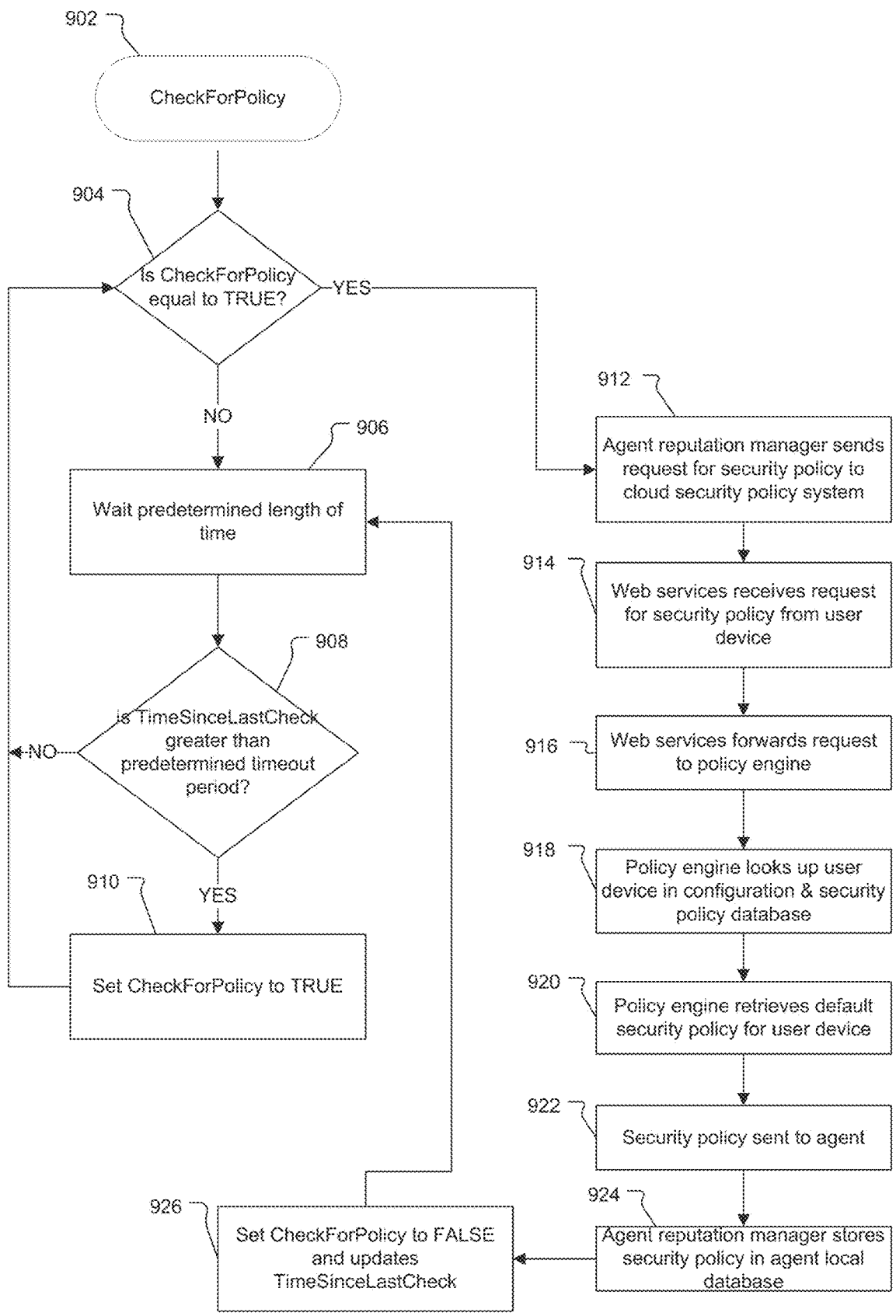
FIG. 10A is a flowchart illustrating the steps performed by the user devices to check for security policies from the cloud security policy system at predefined intervals.

FIG. 10A is a flowchart illustrating the steps performed by the agent security software of the user devices 102-1 to 102-n to check for security policies from the cloud security policy system 107 at predefined intervals.

In the first step 904, the agent reputation manager 204 determines if "CheckForPolicy" equals TRUE. If "CheckForPolicy" does not equal TRUE, then the agent reputation manager 204 waits a predetermined length of time in step 906. In the next step 908, the agent reputation manager 204 determines if "TimeSinceLastCheck" is greater than the specified timeout period. If "TimeSinceLastCheck" is greater than the timeout period, then the reputation manager 204 sets "CheckForPolicy" to TRUE and returns to step 904. If "TimeSinceLastCheck" is not greater than the timeout period, then the reputation manager returns to determine if "CheckForPolicy" equals TRUE in step 904.

Returning to step 904, if "CheckForPolicy" equals TRUE, then the agent reputation manager 204 sends a request for a security policy to the cloud security policy system 107 in step 912. In the next step 914, the web services component 108 receives the request for the security policy from the user device. In the next step 916, the web services component 108 forwards the request to policy engine 110. In the next step 918, the policy engine 110 looks up the user device in configuration & security policy database 112.

Next, the policy engine 110 retrieves the default security policy for the user device in step 920. In the next step 922, the web services component 108 sends the security policy to the user device. In the next step 924, the agent reputation manager 204 stores the security policy in agent local database 206. In the next step 926, the agent reputation manager sets "CheckForPolicy" to FALSE and updates "TimeSinceLastCheck". The agent security software records the time for "TimeSinceLastCheck", so it is able to calculate when then next timeout period should expire, causing the agent security software to recheck for a new security policy.

Figure 10B:
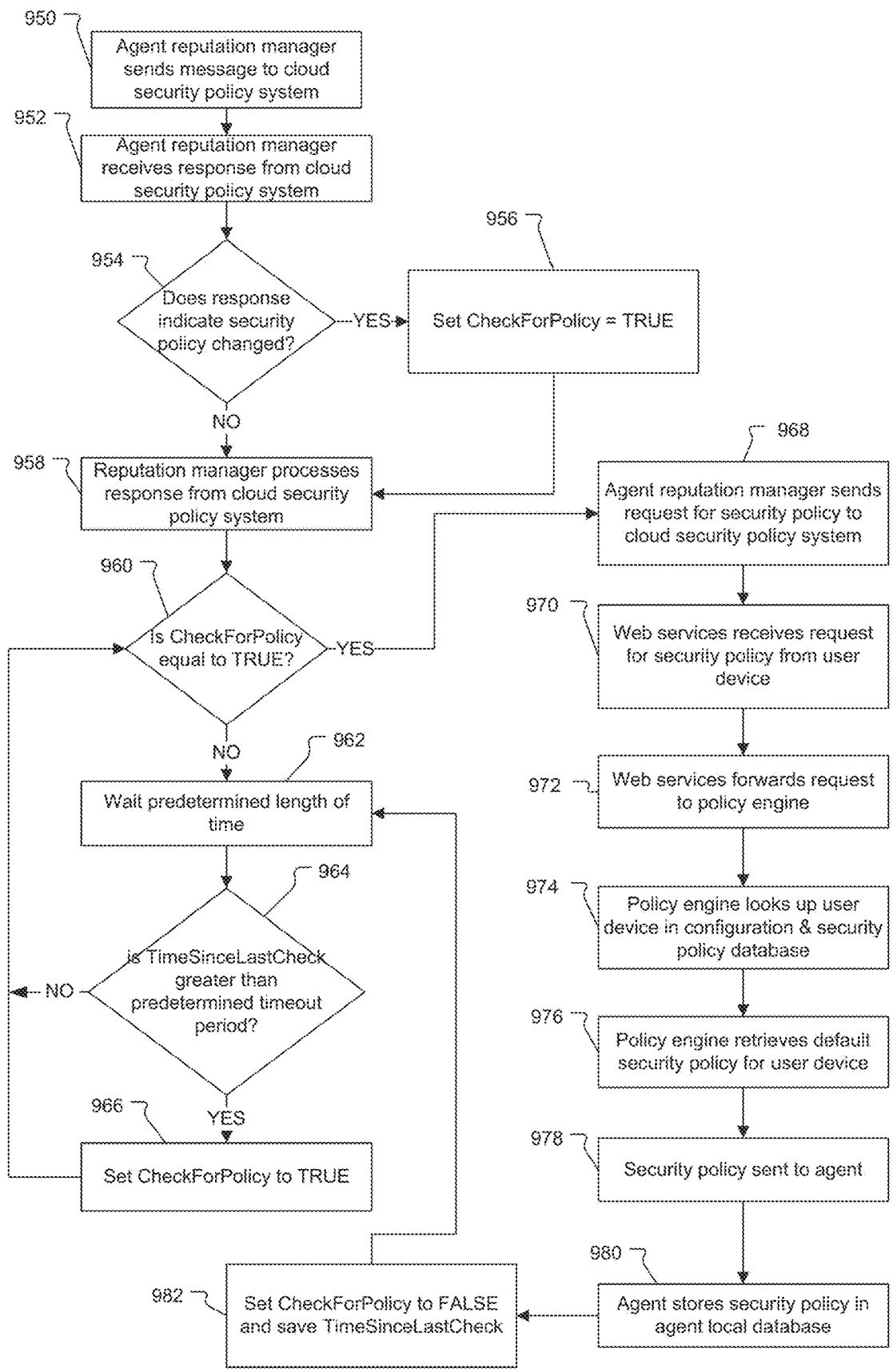
FIG. 10B is a flowchart illustrating the steps performed by the user devices to check for security policies from the cloud security policy system based on messages received from cloud security policy system.

FIG. 10B is a flowchart illustrating the steps performed by the agent security software of the user devices 102-1 to 102-n to check for security policies from the cloud security policy system 107 based on messages or responses received from cloud security policy system 107.

In the first step 950, the agent reputation manager 204 sends a message to cloud security policy system 107. In the next step 952, the agent reputation manager 204 receives a response from cloud security policy system 107. In the next step 954, the agent reputation manager 204 determines if the response indicates that security policy has changed.

If the security policy received from the cloud security policy system 107 has changed, then the reputation manager 204 sets "CheckForPolicy" equal to TRUE in step 956. In the next step 958, or if the response did not indicate that security policy has changed, then the reputation manager processes the response received from cloud security policy system 107.

The remaining steps 960-982 are identical to corresponding steps 904-926 of FIG. 10A. In the preferred embodiment, step 960 is processed by a separated worker thread running in the reputation manager 204.

Figure 11:
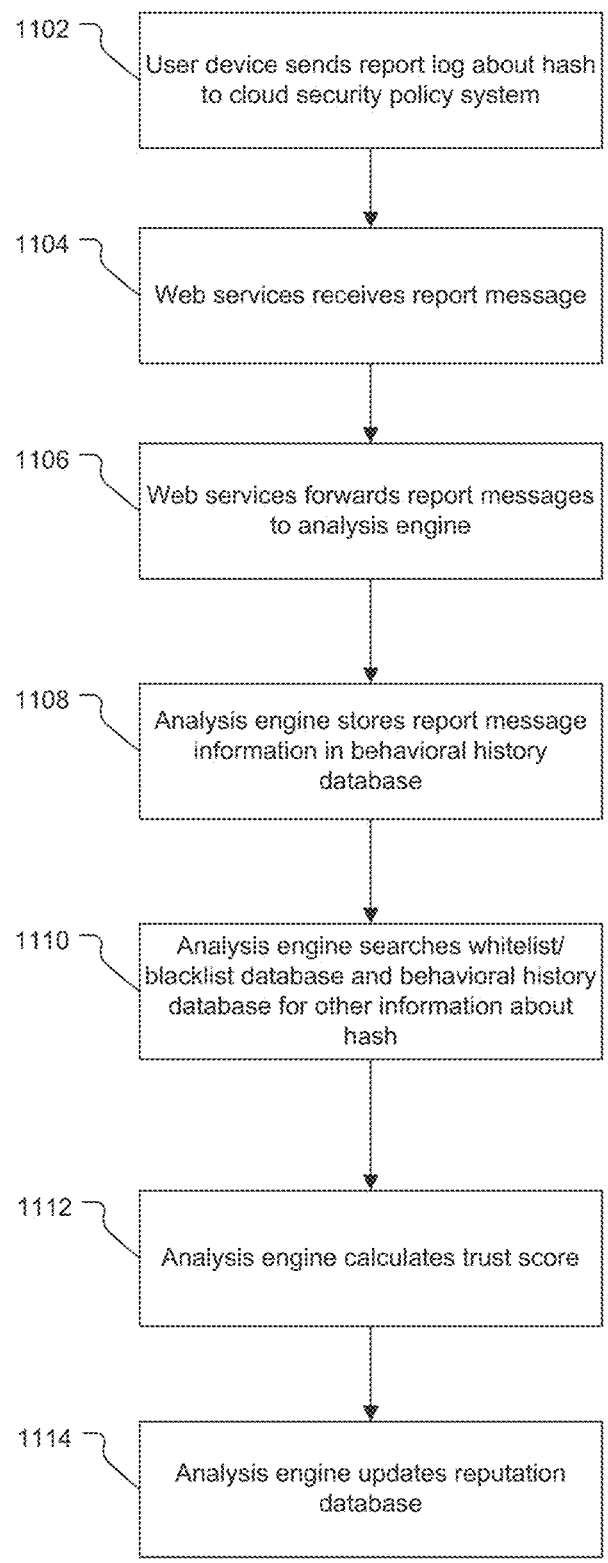
FIG. 11 is a flow diagram illustrating the steps performed by the user devices to send information to the cloud security policy system.

FIG. 11 is a flow diagram illustrating how log information is sent from user devices 102-1 to 102-n to cloud security policy system 107.

In the first step 1102, the user devices 102-1 to 102-n send report messages with report logs about application behaviors to the cloud security policy system 107. In the next step 1104, the web services component 108 receives the report messages. In a typical implementation, when the web services component 108 receives report messages of new hashes from the user devices 102-1 to 102-n, the web services component 108 includes a time-stamp to record when the message arrived.

In the next step 1106, the web services component 108 forwards the report messages to analysis engine 114. The analysis engine 114 stores the report message information in the behavioral history database 118 in step 1108. Additionally, after each report message is received, the behavioral history database 118 is updated to reflect how many different user devices 102-1 to 102-n (or companies) have reported this hash.

In some embodiments, the database behavioral history database 118 also includes a summary record for each hash, which includes a set of information that can be used for enforcing security via access control lists (ACLs) by the agent security software residing on the user devices 102-1 to 102-n. In one implementation, the summary records include a time-stamp of when this hash was first reported to the server, a global "age" for the hash, a count of the number of user devices 102-1 to 102-n that have accessed the hash, a count of the number of organizational units or companies (in a multi-tenant environment) that have accessed the hash, and the trust score of the hash, to list a few examples.

In the next step 1110, the analysis engine 114 searches the whitelist/blacklist database 120 and the behavioral history database 118 for other information about the hash. Next, in step 1112, the analysis engine 114 calculates a trust score for the hash based on the received information and any information found in the whitelist/blacklist database 120 and the behavioral history database 118. In the next step 1114, the analysis engine 114 updates the reputation database 116.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for identifying polymorphic malware on user devices, the method comprising:
monitoring behaviors of one or more applications executing on one or more user devices to determine behavioral fingerprints of the one or more applications, wherein the behaviors of an application represent actions performed by the application;
determining behavioral fingerprints of known malware based on observed behaviors of the known malware, wherein the observed behaviors of the known malware represent actions performed by the known malware;
comparing the behavioral fingerprints of the one or more applications to the behavioral fingerprints of the known malware;
determining if any behavioral fingerprints of at least one of the one or more applications are similar to the behavioral fingerprints of the known malware;
applying security policies to the at least one of the one or more applications based on a similarity of the behavioral fingerprints of the at least one of the one or more applications with the behavioral fingerprints of the known malware and an age of the at least one of the one or more applications; and
calculating a trust score of the at least one of the one or more applications based on the age of the at least one of the one or more applications.

2. The method of claim 1, further comprising identifying the one or more applications as polymorphic variations of specific instances of the known malware based on behaviors exhibited by the specific instances of the known malware and the monitored behaviors of the one or more applications.

3. The method of claim 1, further comprising identifying polymorphic viruses based on whether the one or more applications with different file hashes than the known malware exhibit similar observed behaviors as the known malware.

4. The method of claim 1, further comprising identifying a unique application that only occurs on a single device as a malware based on whether the unique application exhibits similar observed behaviors as the malware.

5. The method of claim 1, wherein the polymorphic malware is a malware that mutates to change contents of files containing the malware and behavior of the malware with respect to previous versions of the malware.

6. The method of claim 1, further comprising receiving, by a security policy system, behavioral information from the one or more user devices, the behavioral information indicating behaviors of the one or more applications executing on the one or more user devices.

7. The method of claim 6, wherein the security policy system stores the behavioral information from the one or more user devices in a behavioral history database.

8. The method of claim 6, wherein applying security policies to the at least one of the one or more applications comprises the security policy system updating the security policies based on the behavioral information, sending the updated security policies to the one or more user devices, and a security agent software executing on each of the one or more user devices enforcing the updated security policies.

9. The method of claim 1, wherein the monitored behaviors include one or more of forming network connections, making system application programming interface (API) calls, accessing, creating and loading files, changing system configurations including modifying system registry values, and monitoring user inputs including turning on microphones or monitoring keystrokes of the user devices.

10. The method of claim 1, wherein the at least one of the one or more applications executing on the one or more user devices is an unknown application.

11. A system for identifying polymorphic malware on user devices, the system comprising:
at least one processor and memory, wherein the processor is programmed to:
monitor behaviors of one or more applications executing on one or more user devices to determine behavioral fingerprints of the one or more applications, wherein the behaviors of an application represent actions performed by the application;
determine behavioral fingerprints of known malware based on observed behaviors of the known malware, wherein the observed behaviors of the known malware represent actions performed by the known malware;
compare the behavioral fingerprints of the one or more applications to the behavioral fingerprints of the known malware;
determine if any behavioral fingerprints of at least one of the one or more applications are similar to the behavioral fingerprints of the known malware;
apply security policies to the at least one of the one or more applications based on a similarity of the behavioral fingerprints of the at least one of the one or more applications with the behavioral fingerprints of the known malware and an age of the at least one of the one or more applications; and
calculate a trust score of the at least one of the one or more applications based on the age of the at least one of the one or more applications.

12. The system of claim 11, further comprising identifying the one or more applications as polymorphic variations of specific instances of the known malware based on behaviors exhibited by the specific instances of the known malware and the monitored behaviors of the one or more applications.

13. The system of claim 11, further comprising identifying polymorphic viruses based on whether the one or more applications with different file hashes than the known malware exhibit similar observed behaviors as the known malware.

14. The system of claim 11, further comprising identifying a unique application that only occurs on a single device as a malware based on whether the unique application exhibits similar observed behaviors as the malware.

15. The system of claim 11, wherein the polymorphic malware is a malware that mutates to change contents of files containing the malware and behavior of the malware with respect to previous versions of the malware.

16. The system of claim 11, further comprising receiving, by a security policy system, behavioral information from the one or more user devices, the behavioral information indicating behaviors of the one or more applications executing on the one or more user devices.

17. The system of claim 16, wherein the security policy system comprises a behavioral history database storing the behavioral information from the one or more user devices.

18. The system of claim 16, wherein applying the security policies to the at least one of the one or more applications comprises the security policy system updating the security policies based on the behavioral information, sending the updated security policies to the one or more user devices, and a security agent software executing on the one or more user devices enforcing the updated security policies.

19. The system of claim 11, wherein the monitored behaviors include one or more of forming network connections, making system application programming interface (API) calls, accessing, creating and loading files, changing system configurations including modifying system registry values, and monitoring user inputs including turning on microphones or monitoring keystrokes of the user devices.

20. The system of claim 11, wherein the at least one of the one or more applications executing on the one or more user devices is an unknown application.

21. One or more non-transitory computer readable media storing instructions that upon execution by a computing device perform a method comprising:
monitoring behaviors of one or more applications executing on one or more user devices to determine behavioral fingerprints of the one or more applications, wherein the behaviors of an application represent actions performed by the application;
determining behavioral fingerprints of known malware based on observed behaviors of the known malware, wherein the observed behaviors of the known malware represent actions performed by the known malware;
comparing the behavioral fingerprints of the one or more applications to the behavioral fingerprints of the known malware;
determining if any behavioral fingerprints of at least one of the one or more applications are similar to the behavioral fingerprints of the known malware;
applying security policies to the at least one of the one or more applications based on a similarity of the behavioral fingerprints of the at least one of the one or more applications with the behavioral fingerprints of the known malware and an age of the at least one of the one or more applications; and
calculating a trust score of the at least one of the one or more applications based on the age of the at least one of the one or more applications.

22. The one or more non-transitory computer readable media of claim 21, wherein the at least one of the one or more applications executing on the one or more user devices is an unknown application, wherein the security policies are applied to the unknown application based on determining whether the unknown application displayed a visible window.

* * * * *